(12) United States Patent
Hao et al.

(10) Patent No.: US 10,764,878 B2
(45) Date of Patent: Sep. 1, 2020

(54) METHOD AND DEVICE FOR TRANSMITTING SIGNAL

(71) Applicant: ZTE CORPORATION, Guangdong (CN)

(72) Inventors: Peng Hao, Guangdong (CN); Jian Li, Guangdong (CN); Xiao Yan, Guangdong (CN)

(73) Assignee: ZTE CORPORATION (CN)

( * ) Notice: Subject to any disclaimer, the term of this patent is extended or adjusted under 35 U.S.C. 154(b) by 53 days.

(21) Appl. No.: 15/735,752

(22) PCT Filed: Mar. 2, 2016

(86) PCT No.: PCT/CN2016/075346
§ 371 (c)(1),
(2) Date: Dec. 12, 2017

(87) PCT Pub. No.: WO2016/206402
PCT Pub. Date: Dec. 29, 2016

(65) Prior Publication Data
US 2018/0160406 A1    Jun. 7, 2018

(30) Foreign Application Priority Data
Jun. 24, 2015 (CN) .......................... 2015 1 0355058

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0048* (2013.01); *H04L 5/0053* (2013.01);
(Continued)

(58) Field of Classification Search
CPC .. H04W 72/042; H04L 5/1469; H04L 5/0094; H04L 5/0082; H04L 5/0053
See application file for complete search history.

(56) References Cited

U.S. PATENT DOCUMENTS

| | | | |
|---|---|---|---|
| 2010/0303013 A1* | 12/2010 | Khandekar | H04W 99/00 370/328 |
| 2013/0223356 A1* | 8/2013 | Khoshnevis | H04W 72/042 370/329 |

(Continued)

FOREIGN PATENT DOCUMENTS

| | | |
|---|---|---|
| CN | 103597900 A | 2/2014 |
| CN | 104702544 A | 6/2015 |

(Continued)

OTHER PUBLICATIONS

European Extended Supplementary Search Report dated Jun. 4, 2018 received in European Patent Application No. 16 81 3518.4.
(Continued)

*Primary Examiner* — Mohammad S Anwar
(74) *Attorney, Agent, or Firm* — McDonald Hopkins LLC (57) ABSTRACT

Disclosed in the present disclosure are a method and device for transmitting a signal. The method comprises: sending and/or receiving, by a transmission point, a signal and/or data in a time unit; the time unit comprises: one or more regions of a first type used to send or receive a signal, and one or more regions of a second type used to send or receive data, and one or more regions of a third type in which no signals or data are sent or received.

20 Claims, 7 Drawing Sheets

(51) Int. Cl.
H04L 5/14 (2006.01)
H04W 16/14 (2009.01)

(52) U.S. Cl.
CPC .......... *H04L 5/0082* (2013.01); *H04L 5/0094* (2013.01); *H04L 5/1469* (2013.01); *H04W 16/14* (2013.01); *H04W 72/0426* (2013.01); *H04W 72/0446* (2013.01)

(56) References Cited

U.S. PATENT DOCUMENTS

| | | | |
|---|---|---|---|
| 2013/0272188 A1 | 10/2013 | Seo et al. | |
| 2015/0084225 A1 | 3/2015 | Behns et al. | |
| 2015/0215107 A1* | 7/2015 | Siomina | H04L 5/16 370/281 |
| 2016/0020891 A1* | 1/2016 | Jung | H04L 5/0064 370/280 |

FOREIGN PATENT DOCUMENTS

| | | |
|---|---|---|
| WO | 2015047917 A1 | 4/2015 |
| WO | 2015/084225 A1 | 6/2015 |

OTHER PUBLICATIONS

International Search Report dated May 20, 2016 issued in PCT/CN2016/075346.
Liu, Banteng, "The research and development of TD-SCDMA signal source and the TD-SCDMA repeater DDC module", Zhejiang University of Technology Master's Dissertation, May 22, 2009 (May 22, 2009), section 2.2.2, with English language abstract.

\* cited by examiner

METHOD AND DEVICE FOR TRANSMITTING SIGNAL

CROSS-REFERENCE TO RELATED APPLICATION

This application is the 371 application of PCT Application No. PCT/CN2016/075346, filed Mar. 2, 2016, which is based upon and claims priority to Chinese Patent Application No. 201510355058.2, filed Jun. 24, 2015, the entire contents of which are incorporated herein by reference.

TECHNICAL FIELD

The present application relates to, but is not limited to, the field of wireless communications.

BACKGROUND

The development of mobile internet has triggered an explosion of mobile data traffic. New services and applications, such as Internet of Things, machine communications, Internet of Vehicles and control networks, also put forward relatively high requirements on wireless communications in terms of time delay and reliability. To meet these challenges, academia and industry have proposed the International Mobile Telecommunications (IMT)-2020 plan to study the fifth generation mobile communication technology, i.e., 5G, 5G will greatly improve the performance of the current long term evolution (LTE, Long Term Evolution) system in terms of time delay, capacity, reliability, flexibility, energy consumption, and so on.

5G puts forward a demand of improving the hotspot region capacity as 1000 times as that of 4G Capacity improvement mainly includes three ways of improving frequency efficiency, increasing frequency spectrum and densely deploying cells. At present, the link spectral efficiency is close to a theoretical limit and no consensus has been reached on the uniform allocation of 5G spectrum in the world. Therefore, the improvement of 5G capacity depends on the dense cell deployment to a great extent.

Ultra dense network (UDN, Ultra Dense Network) is proposed in this context, and can be deemed as a further evolution on small cell (Small Cell) enhancement technique. In the UDN network, a density of transmission points (TPs) will be further improved, and the coverage of TP will be further reduced (dozens of meters, and even tens of meters), and each TP may only serve one or several users.

A backhaul link (BL, Backhaul Link) is one key issue to be solved by the UDN, and directly affects the deployment cost, capacity and performance of the UDN. Transmission points in the ultra-dense network may be classified into two categories, i.e., transmission points using a self-backhaul link (sBL, self-Backhaul Link) and transmission points using a non-self-backhaul link (nsBL, non-self-Backhaul Link). The self-backhaul means that the backhaul link uses the same radio transmission technology and frequency band as that of an access link (AL, Access Link). The backhaul link and the access link may be multiplexed by means of time division or frequency division. Transmission points using nsBL connect to a core network by using transmission technologies different from AL, such as wireless local area network (WLAN, Wireless-LAN), asymmetric digital subscriber line (ADSL, Asymmetric Digital Subscriber Line), etc., and media such as fibers and cables, or the like.

For many application scenarios of the UDN (such as dense blocks), the cost of deploying a wired BL (such as deployment or rental costs of cables or fibers, selection and maintenance costs of site positions, etc.) is often unacceptable and unplanned deployments cannot be implemented. In addition, if the wired BL is provided at the maximum system capacity, the utilization rate of the BL will be very low, which seriously wastes the investment costs. This is because: (1) in the case of dense deployment of TPs, each transmission point serves relatively few users, and the load fluctuates greatly; (2) for the consideration of energy saving or control interference, some TPs will be opened or closed passively; therefore, the BL is often in an idle state; and (3) content prediction and cache technologies increase the fluctuation of resource demands on the BL.

Microwaves are often used as backhaul links for a macro base station, but there are many limitations to use the microwaves in the UDN. On one hand, the microwaves may increase the hardware cost of low power transmission points. Different from the macro base station, a low power TP in the UDN has a lower cost, and microwave hardware contributes more to the hardware cost of the entire transmission point. Secondly, the microwaves may also increase an additional frequency spectrum cost. If an unlicensed frequency spectrum is used, it is often very difficult to control interference, so that the transmission quality of BL cannot be guaranteed. More importantly, the antenna height of TP is relatively low in the major scenario of the UDN, so that the microwaves are blocked easily, which causes the violent fluctuation of the quality of BL.

Figure 1:
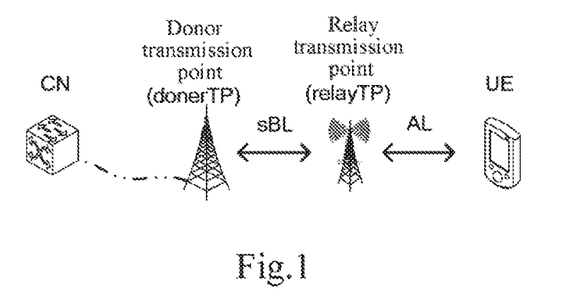
FIG. 1 is a schematic diagram of using two-hop transmission in the related art.

The above analysis shows that sBL is very attractive in the UDN. It does not require wired connections, supports unplanned or semi-planned TP deployment, and effectively reduces the deployment costs. The frequency spectrum and hardware costs can be reduced by sharing the frequency spectrum with AL and wireless transmission technologies. Through the joint resource allocation between AL and BL, the system can adaptively adjust the resource allocation ratio according to the network load conditions, so as to improve the resource utilization. In addition, through the joint optimization with AL, the quality of the wireless self-backhaul link can be effectively guaranteed, and the transmission reliability can be greatly improved. Using the sBL technology means that multiple hop transmission is needed from the first sending point to the last receiving point (terminal). FIG. 1 is a schematic diagram of using two-hop transmission. As shown in FIG. 1, the core network (CN, Core Network) communicates with a user equipment (UE, User Equipment) through a donor transmission point (donorTP) and a relay transmission point (relayTP).

The method for transmitting a signal in the related art substantially includes:

receiving and/or sending, by a transmission point, a signal and/or data in a time unit.

As shown in Table 1, the time unit includes: a downlink control area (Control (DL)), a data area (Data(Tx)), a guard period (GP, Guard Period) and an uplink control area (Control (UL)).

TABLE 1

| Control (DL) | Data (Tx) | GP | Control (UL) |
| --- | --- | --- | --- |

This section provides background information related to the present disclosure which is not necessarily prior art.

SUMMARY

The following is a summary of the subject described in detail herein. This summary is not intended to limit the protection scope of the claims.

According to the method for transmitting a signal in the related art, the downlink control area is fixed at a head of the time unit while the uplink control area is fixed at a tail of the time unit, thus the configuration flexibility for the transmission demand of multiple hop transmission points is low.

It is provided a method and device for transmitting a signal herein, which can improve the configuration flexibility for the transmission demand of the multiple hop transmission points.

A method for transmitting a signal includes:

sending and/or receiving, by a transmission point, a signal and/or data in a time unit;

wherein, the time unit includes: at least one first type of region used to send or receive a signal, and at least one second type of region used to send or receive data, and at least one third type of region in which no signals or data are sent or received.

Optionally, resource mapping methods and/or configuration parameters for signals of individual first type of regions in the same time unit are independent from each other.

Optionally, the method, before sending and/or receiving, by the transmission point, the signal and/or data in the time unit, further includes:

setting, by the transmission point, the first type of region as a first type of region for sending or a first type of region for reception.

Optionally, the setting, by the transmission point, the first type of region as the first type of region for sending or the first type of region for reception includes:

setting, by the transmission point, the first type of region as the first type of region for sending or the first type of region for reception according to a signal sending or receiving demand;

or, setting, by the transmission point, the first type of region as the first type of region for sending or the first type of region for reception according to a configuration signaling from another transmission point.

Optionally, the setting, by the transmission point, the first type of region as the first type of region for sending or the first type of region for reception according to the signal sending or receiving demand includes:

when sending the signal to another transmission point in the time unit, setting, by the transmission point, the first type of region corresponding to the first type of region for reception of said another transmission point as the first type of region for sending;

or, when receiving the signal from another transmission point in the time unit, setting, by the transmission point, the first type of region corresponding to the first type of region for sending of said another transmission point as the first type of region for reception.

Optionally, the setting, by the transmission point, the first type of region as the first type of region for sending or the first type of region for reception according to the configuration signaling from another transmission point includes:

receiving, by the transmission point, the configuration signaling from said another transmission point;

setting the first type of region for sending indicated in the configuration signaling as the first type of region for sending and/or setting the first type of region for reception indicated in the configuration signaling as the first type of region for reception, by the transmission point.

Optionally, the receiving, by the transmission point, the configuration signaling from said another transmission point includes:

receiving, by the transmission point, the configuration signaling from said another transmission point semi-statically or dynamically.

Optionally, receiving and sending functions of the first type of regions in different time units are independent from each other.

Optionally, the receiving and sending functions of the first type of regions in different time units are independent from each other, including:

the receiving and sending functions of the first type of regions having the same positions in part of the time units are the same;

or, the receiving and sending functions of the first type of regions having the same positions in part of the time units are different;

or, receiving and sending functions of part of the first type of regions having the same positions in part of the time units are different;

or, the receiving and sending functions of part of the first type of regions having the same positions in part of the time units are same.

Optionally, part of the first type of regions are the first type of regions for sending and the others are the first type of regions for receiving;

or, all the first type of regions are the first type of regions for sending or receiving.

Optionally, the signal is a control signal and/or a reference signal.

Optionally, the control signal is a feedback signaling corresponding to data transmission, and/or a scheduling signaling corresponding to data transmission, and/or a measurement feedback signaling.

Optionally, the information carried by the control signal includes at least one of the followings:

downlink data scheduling information, uplink data scheduling information, downlink data feedback information, uplink data feedback information, and channel measurement feedback information.

Optionally, structures of the control signals and/or structures of the reference signals sent in the first type of regions of different transmission points are the same.

Optionally, the structure of the control signal or the structure of the reference signal includes at least one of the followings:

a multiplexing manner, a modulation coding manner, a time-frequency resource mapping manner and a used sequence of each user.

Optionally, all the first type of regions are disposed at the same side of all the second type of regions;

or, the first type of regions are disposed at both sides of all the second type of regions;

or, the first type of regions and the second type of regions are distributed in an interleaved manner.

Optionally, the first type of regions are disposed at both sides of all the second type of regions, including:

part of the first type of regions are disposed at one side of all the second type of regions; and the other first type of regions are disposed at the other side of all the second type of regions.

Optionally, the third type of region is disposed between two of the first type of regions;

and/or, the third type of region is disposed between the first type of region and the second type of region.

Optionally, the third type of region is used for signal sending-receiving conversion, or interference protection, or time alignment.

Optionally, the time unit is a minimum time unit for one scheduling or resource allocation in a time domain.

Optionally, at least one of the time units are a time unit for one scheduling or resource allocation.

Optionally, the transmission point includes one of the followings:

a donor transmission point donorTP, a relay transmission point relayTP and a user equipment UE.

Optionally, the donorTP is a transmission point directly connected to a core network through a non-self-backhaul link nsBL.

Optionally, the donorTP is a base station, or a remote radio head RRH.

Optionally, the relayTP is a non-UE transmission point with at least one hop on a path from the relayTP to the core network being a self-backhaul link sBL.

A device for transmitting a signal includes:

a sending-receiving module configured to send and/or receive a signal and/or data in a time unit;

wherein, the time unit includes: at least one first type of region used to send or receive a signal, and at least one second type of region used to send or receive data, and at least one third type of region in which no signals or data are sent or received.

Optionally, the device further includes:

a setting module configured to set a first type of region as the first type of region for sending or a first type of region for reception.

Optionally, the setting module is configured to:

set the first type of region as the first type of region for sending or the first type of region for reception according to a signal sending or receiving demand;

or, set the first type of region as the first type of region for sending or the first type of region for reception according to a configuration signaling from another transmission point.

Optionally, the setting module is configured to:

when sending the signal to another transmission point in the time unit, set the first type of region corresponding to the first type of region for reception of said another transmission point as the first type of region for sending;

or, when receiving the signal from another transmission point in the time unit, set the first type of region corresponding to the first type of region for sending of said another transmission point as the first type of region for reception;

or, set the first type of region as the first type of region for sending or the first type of region for reception according to a configuration signaling from another transmission point.

Optionally, the setting module is configured to:

set the first type of region as the first type of region for sending or the first type of region for reception according to a signal sending or receiving demand.

receive a configuration signaling from another transmission point; set the first type of region for sending indicated in the configuration signaling as the first type of region for sending, and set the first type of region for reception indicated in the configuration signaling as the first type of region for reception.

Optionally, the setting module is configured to:

set the first type of region as the first type of region for sending or the first type of region for reception according to a signal sending or receiving demand;

or, receive the configuration signaling from another transmission point semi-statically or dynamically; set the first type of region for sending indicated in the configuration signaling as the first type of region for sending, and set the first type of region for reception indicated in the configuration signaling as the first type of region for reception.

A computer-readable storage medium stores a computer-executable instruction, wherein the computer-executable instruction is configured to execute any one of the methods mentioned above.

Compared with the related art, the embodiments of the present disclosure include: sending and/or receiving, by the transmission point, the signal and/or data in the time unit; wherein, the time unit includes: at least one first type of region used to send or receive a signal, and at least one second type of region used to send or receive data, and at least one third type of region in which no signals or data are sent or received. Through the solutions in the embodiments of the present disclosure, the positions and quantities of each type of the regions in the transmission point can be configured as needed, which improves the configuration flexibility of the transmission demand of the multiple-hop transmission point.

Other aspects will become apparent upon reading and understanding the drawings and detailed description.

This section provides a summary of various implementations or examples of the technology described in the disclosure, and is not a comprehensive disclosure of the full scope or all features of the disclosed technology.

DETAILED DESCRIPTION

The embodiments of the present disclosure are described with reference to the drawings hereinafter. It should be noted that, in the case of no conflict, the embodiments in the application and the features in the embodiments may be combined with each other.

Figure 2:
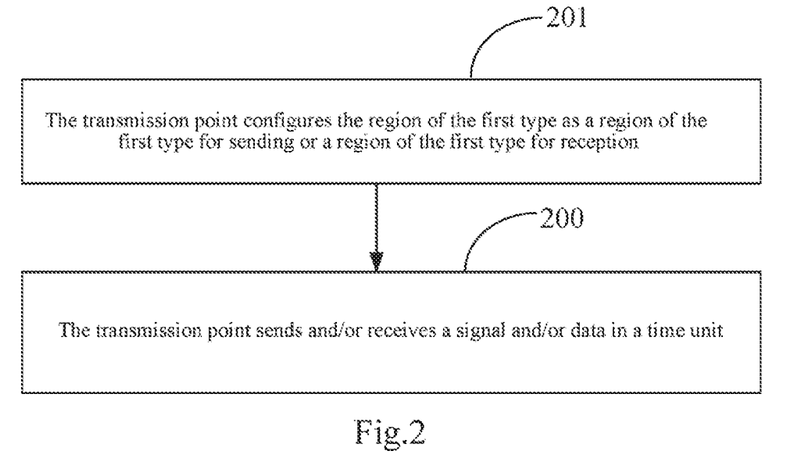
FIG. 2 is a flow chart of a method for transmitting a signal according to an embodiment of the present disclosure.

Referring to FIG. 2, the embodiment of the present disclosure provides a method for transmitting a signal, including the following step.

In step 200, a transmission point sends and/or receives a signal and/or data in a time unit.

In this step, the time unit includes: at least one first type of region used to send and/or receive a signal, at least one second type of region used to send or receive data, and at least one third type of region in which no signal or data is sent or received.

Resource mapping methods and/or configuration parameters for signals of respective first type of regions in the same time unit are mutually independent.

Receiving and sending functions of the first type of regions in different time units are mutually independent.

The receiving and sending functions of the first type of regions in different time units are mutually independent, including:

the receiving and sending functions of the first type of regions having the same positions in part of the time units are different;

or, the receiving and sending functions of the first type of regions having the same positions in part of the time units are the same;

or, the receiving and sending functions of part of the first type of regions having the same positions in part of the time units are different;

or, the receiving and sending functions of part of the first type of regions having the same positions in part of the time units are the same.

Part of the first type of regions are the first type of regions for sending and the others are the first type of regions for reception;

or, all the first type of regions are the first type of regions for sending or reception.

All the first type of regions are disposed at the same side of all the second type of regions;

or, the first type of regions are disposed at both sides of all the second type of regions;

or, the first type of regions and the second type of regions are distributed in an interleaved manner.

The first type of regions are disposed at both sides of all the second type of regions, including:

part of the first type of regions are disposed at one side of all the second type of regions, and the other first type of regions are disposed at the other side of all the second type of regions.

The third type of region is disposed between two first type of regions;

and/or, the third type of region is disposed between the first type of region and the second type of region.

The third type of region is used for signal sending-receiving conversion, or interference protection, or time alignment.

In this step, the signal is a control signal and/or a reference signal.

The control signal is a feedback signaling corresponding to data transmission, and/or a scheduling signaling corresponding to data transmission, and/or a measurement feedback signaling.

The information carried by the control signal includes at least one of the followings:

downlink data scheduling information, uplink data scheduling information, downlink data feedback information, uplink data feedback information, and channel measurement feedback information.

Structures of the control signals and/or structures of the reference signals sent in the first type of regions of the different transmission points are the same.

The structure of the control signal or the structure of the reference signal includes at least one of the followings:

a multiplexing manner, a modulation coding manner, a time-frequency resource mapping manner and a used sequence of each user.

In this step, the time unit is a minimum time unit for one scheduling or resource allocation in at least one time domain.

In this step, at least one time units are a time unit for one scheduling or resource allocation.

In this step, the transmission point is one of the followings:

a donorTP, a relayTP and a UE.

Optionally, the donorTP is a transmission point directly connected to a core network through an nsBL.

Optionally, the donorTP is a base station, or a remote radio head (RRH, Remote Radio Head), etc.

Optionally, the relayTP is a non-UE transmission point with at least one hop on a path from itself to the core network being an sBL.

As an optional step, the method further includes the following step.

In step 201, the transmission point sets the first type of region as the first type of region for sending or the first type of region for reception, including:

setting, by the transmission point, the first type of region as the first type of region for sending or the first type of region for reception according to a signal sending or receiving demand;

or, setting, by the transmission point, the first type of region as the first type of region for sending or the first type of region for reception according to a configuration signaling from another transmission point.

That is to say, the transmission point may set the functions of the first type of region flexibly, wherein the functions include a sending function and a receiving function, and the first type of region may be used for sending or used for receiving.

The setting, by the transmission point, the first type of region as the first type of region for sending or the first type of region for reception according to the signal sending or receiving demand includes:

when sending a signal to another transmission point in the time unit, setting, by the transmission point, the first type of region corresponding to the first type of region for reception of said another transmission point as the first type of region for sending;

or, when receiving a signal from another transmission point in the time unit, setting, by the transmission point, the first type of region corresponding to the first type of region for sending of said another transmission point as the first type of region for reception.

The setting, by the transmission point, the first type of region as the first type of region for sending or the first type of region for reception according to the configuration signaling from another transmission point includes:

receiving, by the transmission point, the configuration signaling from the another transmission point; setting, by the transmission point, the first type of region for sending indicated in the configuration signaling as the first type of region for sending, and/or setting the first type of region for reception indicated in the configuration signaling as the first type of region for reception.

The receiving, by the transmission point, the configuration signaling from another transmission point includes:

receiving, by the transmission point, the configuration signaling from said another transmission point in a semi-static state or dynamically.

The receiving, by the transmission point, the configuration signaling from said another transmission point in the semi-static state may include: periodically receiving the configuration signaling from said another transmission point.

The receiving, by the transmission point, the configuration signaling from said another transmission point dynamically may include: receiving the configuration signaling from said another transmission point in real time.

Through the solutions of the embodiments of the present disclosure, replacing "uplink/downlink" by "receiving/sending" reflects the peer-to-peer design, which facilitates the unified design of uplink/downlink. Each type of regions in the transmission point can be disposed at will, thus realizing the configuration for the transmission demand of multiple-hop transmission point. For example, for the same TP, the positions and quantities of the first type of regions for sending and the first type of regions for receiving may be the same or different in different subframes; and for different TPs, the positions and quantities of the first type of regions for sending and the first type of regions for receiving may be the same or different in the same subframe. For a multiple-hop scenario, the first type of regions for sending and the first type of regions for receiving may be dynamically configured according to a transmission demand, so as to implement decoupling of resource allocation and data transmission (feedback) between sBL and AL while implementing uplink and downlink resource allocation and signal feedback, for example, no matter the current time unit is BL or AL, the reference signals in the first type of regions can be multiplexed to realize the measurement of several other transmission points by a certain transmission point, and realize measurement and decoupling of BL/AL.

In addition, the control domain of the method in the related art is uniformly configured. According to the method of the embodiments of the present disclosure, the first type of region may be randomly configured. For example, control signals of different transmission points are mapped to different first type of regions to avoid the mutual interference of the control signals among the transmission points.

The methods according to the embodiments of the present disclosure will be described in detail hereinafter.

In the following embodiments, two-hop transmission is taken as an example for description, and the same applies to multi-hop transmission.

Figure 3A:
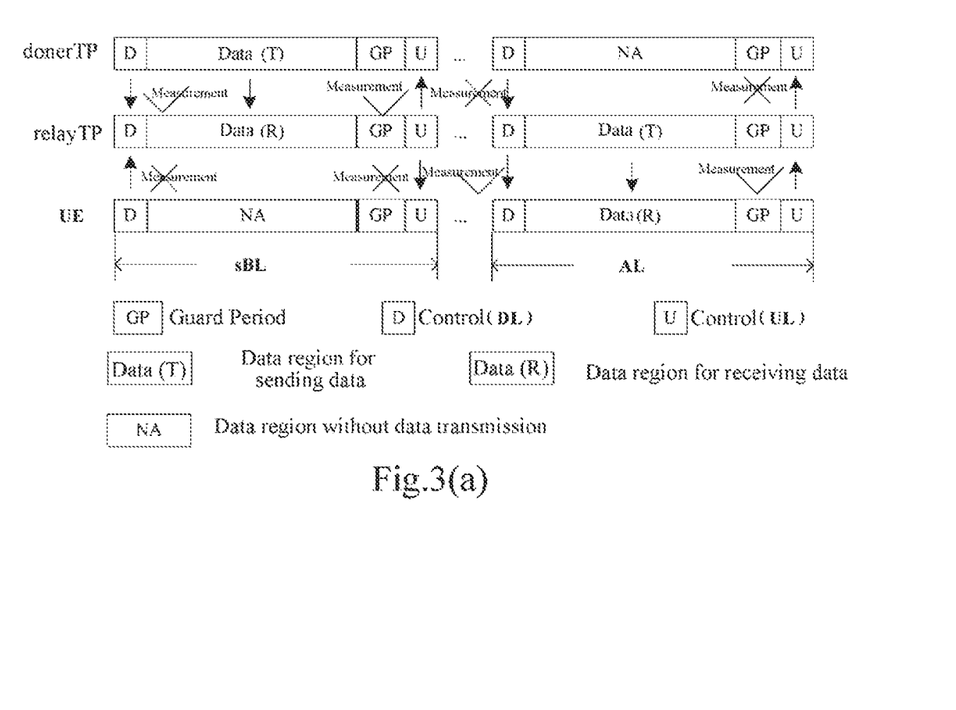
FIG. 3(a) is a measurement relationship when using the method of the related art in a first embodiment of the present disclosure.

In a first embodiment, FIG. 3(a) is a measurement relationship when using the method of the related art. In the method of the related art as shown in FIG. 3(a), a control region located at the head of a time unit can only be used for sending or receiving a downlink control signal and a reference signal, while a control region located at the tail of the time unit can only be used for sending or receiving an uplink control signal and a reference signal. The reference signal is mainly used for channel measurement, cell selection and other functions, while the control signal transmits such information as a scheduling instruction, a modulation coding manner, a data transmission feedback, etc. The GP in the figure is an uplink and downlink conversion time for the transmission point, and avoids the mutual interference between uplink and downlink.

When using the method of the related art, as shown in FIG. 3(a), when a time unit is allocated to the downlink of an sBL, a relayTP receives a downlink reference signal sent by a donorTP at the head and sends the reference signal to the donorTP in a control domain at the tail. The donorTP and the relayTP may measure each other because they may mutually receive the reference signal sent by each other. However, a downlink of a UE control domain is also at the head and its uplink is at the tail; therefore, in the time unit, the UE can only receive the reference signal in the control domain at the head and send the reference signal in the control domain at the tail, while the relayTP cannot receive the reference signal of the donorTP and send the reference signal to the UE at the same time, so that the relayTP and the UE cannot measure each other. Similarly, when the time unit is allocated to the downlink of an AL, mutual measurement between the UE and the relayTP can be implemented. However, mutual measurement between the relayTP and the donorTP cannot be implemented since both the relayTP and the donorTP send a reference signal in the control domain at the head and receive a reference signal in the control domain at the tail.

In 5G, mutual measurement between sending and receiving points is of great importance for pre-coding a massive antenna array (Massive MIMO, Massive Multiple-Input Multiple-Output) and tracking a wave velocity in millimeter-wave communications. The frequency and accuracy of measurement have an important influence on the performance of the two technologies. The method of the related art may result in a failure of the measurement between the relayTP and the UE or the donorTP in some time units, which is unfavorable for taking advantages of these technologies.

Figure 3B:
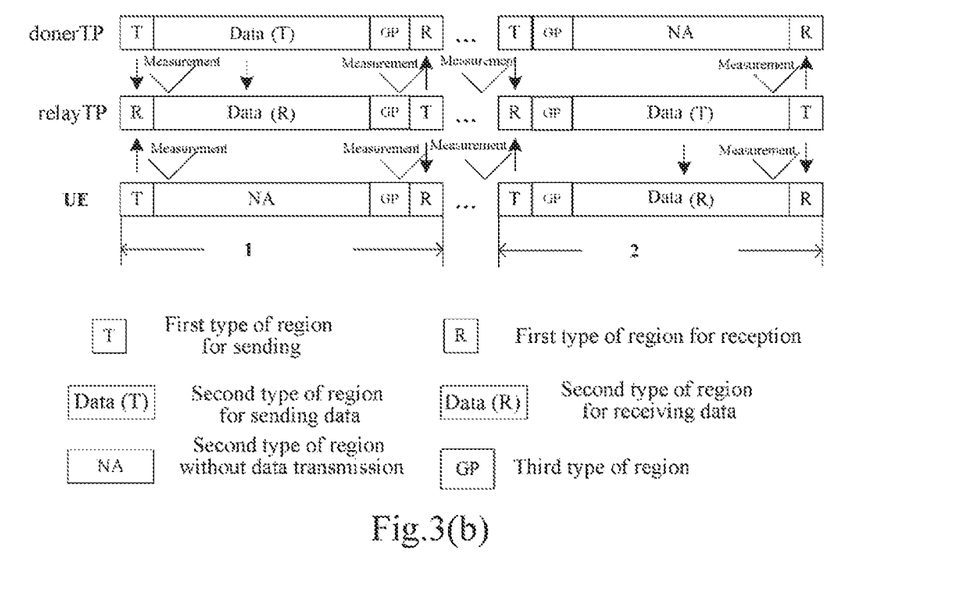
FIG. 3(b) is a measurement relationship when using a method of the present disclosure in the first embodiment of the present disclosure.

Through the method according to the embodiment of the present disclosure, the positions of the first type of regions for sending/receiving in the same time unit may be different for different transmission points. FIG. 3(b) is a measurement relationship of using the method according to the embodiment of the present disclosure. As shown in FIG. 3(b), for a two-hop scenario, when the time unit is allocated to the downlink of the sBL, the relayTP receives signals in the first type of region at the head and sends signals in the first type of region at the tail. At this time, the relayTP may configure the UE to send signals in the first type of region at the head and to receive signals in the first type of region at the tail through a configuration signaling; in this way, the relayTP can measure the UE and the donorTP at the same time. When the time unit is allocated to the downlink of the AL, the donorTP may be set to receive signals in the first type of region at the head and send signals in the first type of region at the tail. At this time, both the UE and the donorTP can measure the relayTP. Therefore, the mutual measurement between the relayTP and the UE, as well as between the relayTP and the donorTP can be completed in each time unit by using the embodiment of the present disclosure, which is beneficial for improving the performances of Massive MIMO and millimeter-wave communications.

It can also be found that if the method of the related art is used to realize the mutual measurement between the transmission points of a two-hop system in FIG. 1, four links including sBL downlink, sBL uplink, AL downlink and AL uplink have to be used. When using the embodiment of the present disclosure, the differences between sBL and AL can be ignored, and it only needs to describe whether each of the first type of regions is used for receiving or sending, so that the description is greatly simplified. For the first time unit in FIG. 3 (b), the use of sending and receiving may be described as—the relayTP receives a control signal at the head and sends the control signal at the tail; to realize mutual measurement, both the donorTP and the UE may be set to send the control signal at the head and receive the control signal at the tail. Using sending/receiving for description rather than uplink/downlink can better reflect the peer-to-peer design. It can also be seen from the embodiments that the embodiments of the present disclosure can better support the implementation of the peer-to-peer design.

Figure 4A:
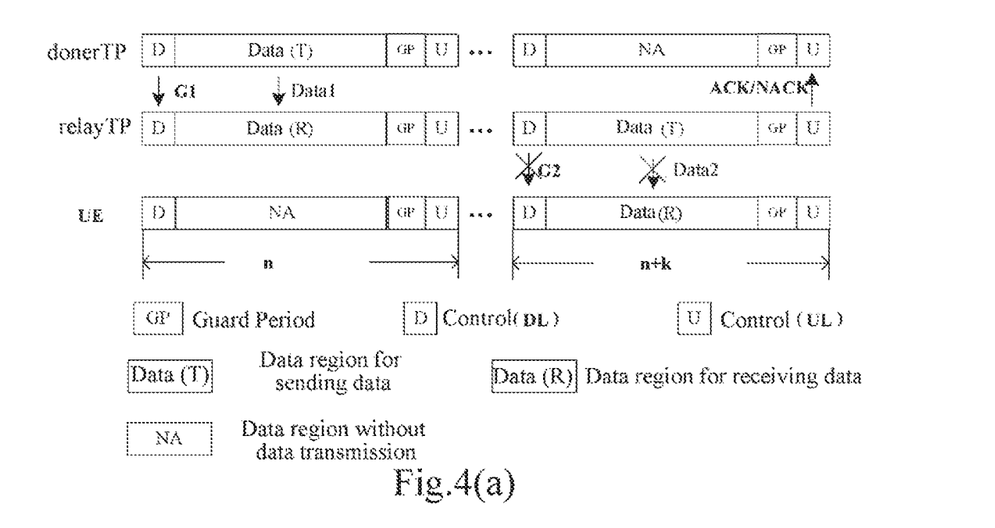
FIG. 4(a) is a measurement relationship when using the method of the related art in a second embodiment of the present disclosure.

In a second embodiment, FIG. 4(a) is a measurement relationship when using the method of the related art. As shown in FIG. 4(a), according to the method of the related art, the control domains at the head are set as downlinks and the control domains at the tail are set as uplinks for all the transmission points. It is stipulated that a receiving point after receiving data needs to feed back to a sender in a $k^{th}$ time unit. If an $n^{th}$ time unit is allocated to the downlink of an sBL, then a time unit (n+k) has to be allocated to the uplink of the sBL. In the time unit (n+k), a relayTP needs to use an uplink control channel to transmit feedback information. If there is no data needing to be transmitted in the uplink of the sBL, while there is data needing to be transmitted on the AL, then it will cause waste of resources. Therefore, the method of the related art cannot achieve decoupling of resource allocation and control signaling of the sBL/AL, and limits the freedom of scheduling.

Figure 4B:
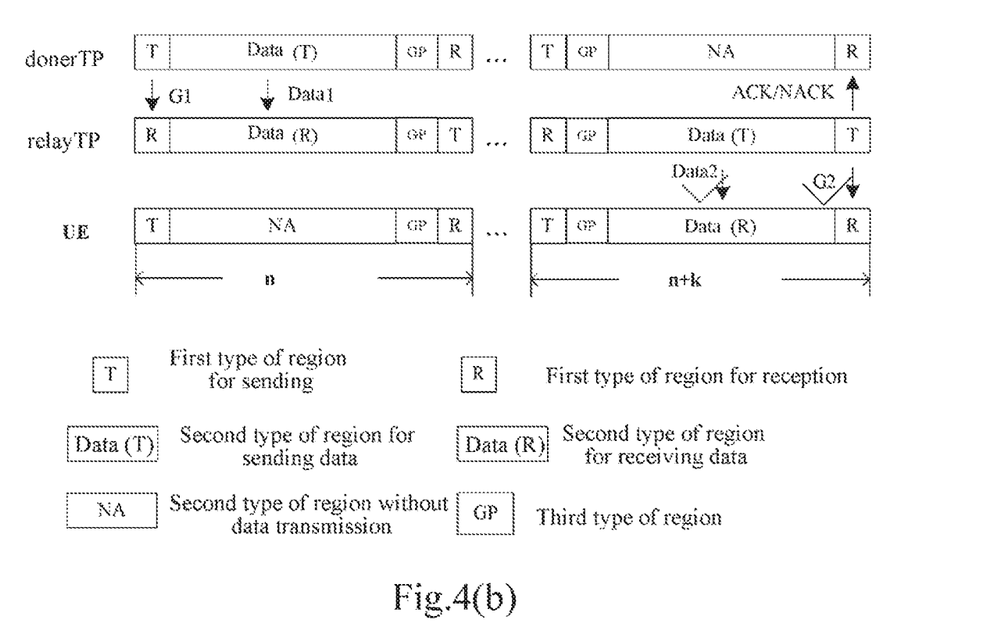
FIG. 4(b) is a measurement relationship when using the method of the present disclosure in the second embodiment of the present disclosure.

FIG. 4(b) is a measurement relationship of using the method according to the embodiment of the present disclosure. As shown in FIG. 4(b), in a time unit (n+k), functions of first type of regions of three transmission points may be configured according to feedback and data transmission demands, for example, a configuration signaling (such as a radio resource control (RRC, Radio Resource Control) protocol) is used to configure, in a semi-static state, a first type of region for receiving of a relayTP at the head of the time unit and a first type of region for sending at the tail of the time unit, and configure first type of regions for sending of a UE and a donorTP at the head of the time unit and first type of regions for receiving of the UE and the donorTP at the tail of the time unit. In this way, even if the time unit (n+k) is used for the AL, the donorTP can receive acknowledgement (ACK, Acknowledgement)/non acknowledgement (NACK, Non Acknowledgement) information fed back by the relayTP. Therefore, the decoupling of resource allocation and control signaling can be realized by the method according to the embodiment of the present disclosure.

Figure 5A:
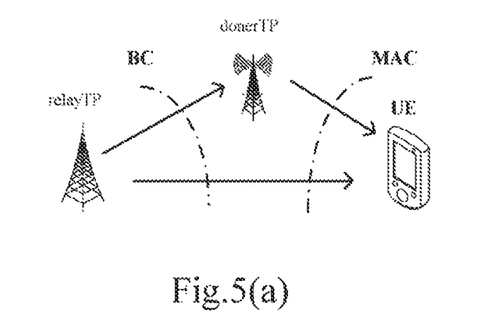
FIG. 5(a) is a schematic diagram of a system adopting a BC+MAC solution for transmission according to a third embodiment of the present disclosure.

In a third embodiment, under a poor scattering condition, a channel between a donorTP and a UE does not satisfy a multi-stream transmission condition; therefore, a BC+MAC (Broadcast Channel and Multiple Address Channel) solution is adopted. FIG. 5(a) is a schematic diagram of a system adopting the BC+MAC solution for transmitting. As shown in FIG. 5(a), the donorTP may transmit data to the UE and a relayTP at the same time in a BC stage, while in an MAC stage, the donorTP and the relayTP may transmit data to the UE at the same time. The essence is to extend the freedom of a spatial-domain by using the relayTP, to carry out multi-stream transmission and improve the throughput.

Figure 5B:
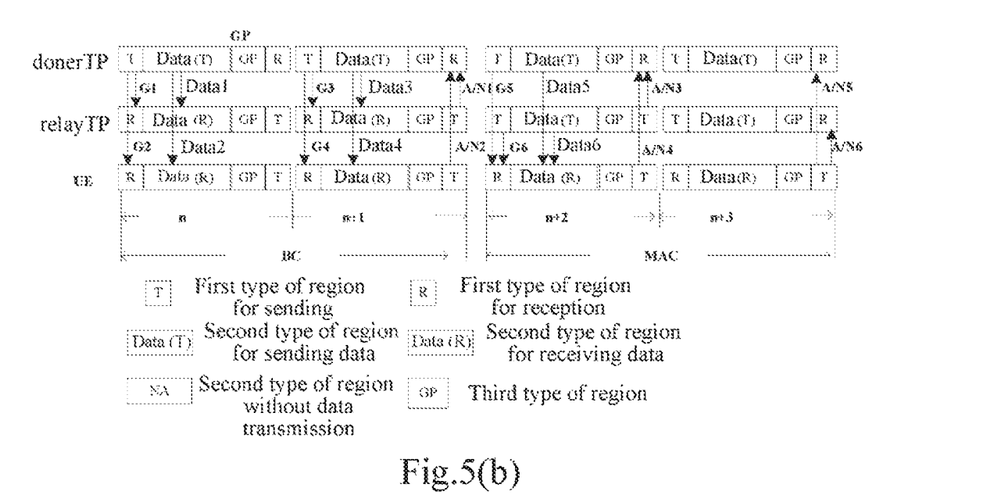
FIG. 5(b) is a schematic diagram of using the method of the present disclosure for feedback according to the third embodiment of the present disclosure.

FIG. 5(b) is a schematic diagram of using the method according to the embodiment of the present disclosure for feedback. As shown in FIG. 5(b), the donorTP sends signals to the relayTP and the UE at the same time in time units n and (n+1) in the BC stage. In the MAC stage, the donorTP and the relayTP sends signals to the UE at the same time in time units (n+2) and (n+3). It is supposed that a spacing between data and A/N (i.e., ACK/NACK) feedback is one time unit, i.e., A/N1 and A/N2 of data1/data2 of the data in the time unit n are fed back in the time unit (n+1). In the first time unit of the MAC stage, i.e., the time unit (n+2), although the control domains and the data portions at the heads of the donorTP and the relayTP send a downlink signal (i.e., the downlink of an AL) to the UE, in order to feed back A/N3 and A/N4 of data3 and data4, the control domain at the tail of the relayTP is not available for the uplink of the AL (not available for receiving), but shall be used for the uplink of a BL (used for sending). Through the method according to the embodiment of the present disclosure, the first type of region of the donorTP at the tail of the time unit (n+1) is configured to be an R region, and the first type of regions of the relayTP and the UE at the tail of the time unit (n+1) is configured to be T regions in the MAC stage; and in the time unit (n+1), two first type of regions of the relayTP in the time unit (n+2) to be T regions through a downlink control information (DCI, Downlink Control Information) format message, thereby the decoupling of data transmission and control signaling can be achieved. Meanwhile, control signals and/or reference signals in two first type of regions for sending of the relayTP in the time unit (n+2) in FIG. 5(b) may be independently configured, including using different configuration parameters and resource mapping manners. For example, different sequences are used for the reference signals of two first type of regions for sending, or, a resource mapping manner of first time domain and then frequency domain is used for one first type of region for sending, and a resource mapping manner of first frequency domain and then time domain is used for the other first type of region for sending. Therefore, the embodiment of the present disclosure can support new scenarios and applications more flexibly.

Figure 6A:
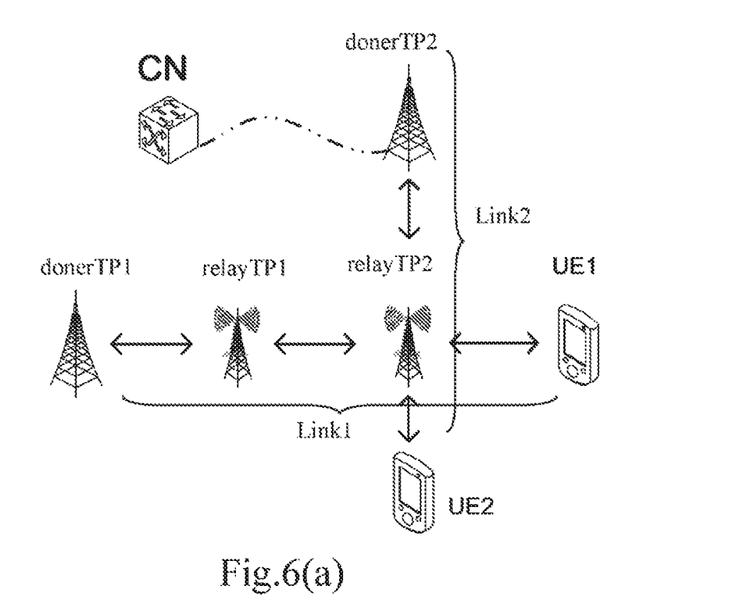
FIG. 6(a) is a schematic diagram of a structural composition of a double-link transmitting system according to a fourth embodiment of the present disclosure.

In a fourth embodiment, receiving and sending functions of control regions can be configured for each transmission point in the embodiment of the present disclosure through a network level, and different receiving and sending configurations of the control regions are adopted in different time units according to the need. FIG. 6(a) is a schematic diagram of a structural composition of a double-link transmitting system. As shown in FIG. 6, a relayTP2 receives data from a donorTP1 and a donorTP2. For a network path from the donorTP1 to a link1 of a UE1 via a relayTP1 and the relayTP2, the donorTP1 and the UE1 are endpoints of a data stream. From an aspect of downlink data transmission, the donorTP1 is a starting point of the data stream, while the UE1 is the end point of the data stream; while from an aspect of uplink data transmission, the UE1 is the starting point of the data stream, and the donorTP1 is the end point of the data stream. In order to configure the sending and receiving area of the first type of region correctly, each transmission point may set a corresponding first type of region according to a receiving-sending relationship of a transmission point which is closer to an endpoint of the data transmission in the network level and directly communicates with itself.

Figure 6B:
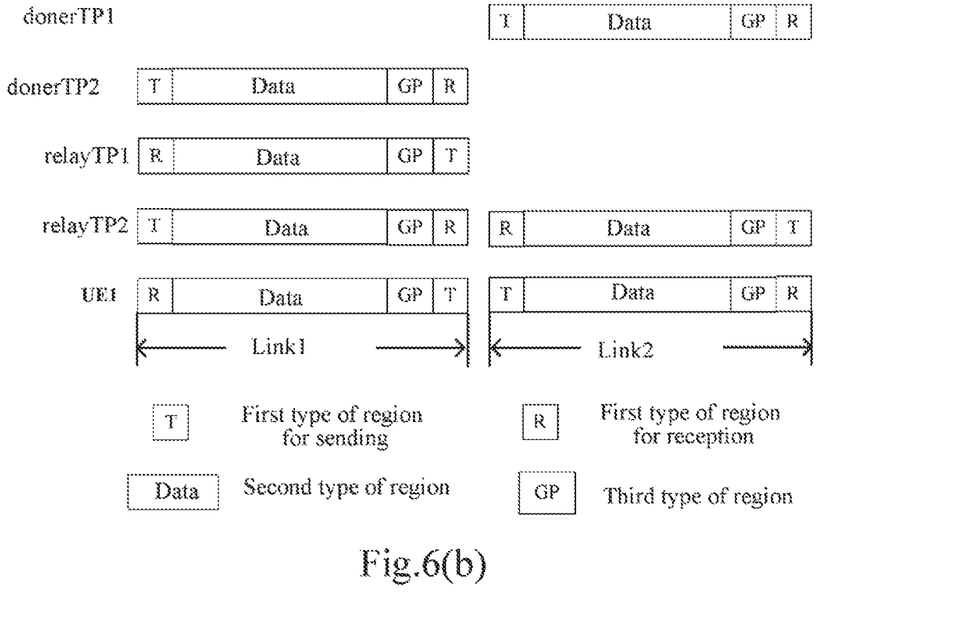
FIG. 6(b) is a schematic diagram of setting a first type of region by referring to a transmission point close to a downlink data transmission starting point according to the fourth embodiment of the present disclosure.

FIG. 6(b) is a schematic diagram of setting the first type of region by referring to a transmission point close to a starting point of downlink data transmission. As shown in FIG. 6(b), the donorTP1 sets the first type of region at the head for sending and sets the first type of region at the tail for receiving. Because the donorTP1 directly communicates with the relayTP1, and is closer to the starting point of the downlink data than the relayTP1, the relayTP1 sets the first type of region thereof according to the receiving-sending relationship with the donorTP1, sets the first type of region at the head thereof as receiving and sets the first type of region at the tail thereof as sending, so as to guarantee correct receiving and sending of control information. Similarly, the relayTP2 sets the first type of region thereof according to the receiving-sending relationship with the relayTP1, while the UE1 may set the first type of region thereof according to the receiving-sending relationship with the relayTP2. A manner of setting the receiving and sending functions of the control regions by referring to the starting point closer to uplink data transmission is similar to the above method, and will not be described here.

The relayTP2 may communicate with the relayTP1 or the donorTP2 respectively in different time units. When the relayTP2 is disposed in different network paths, the relayTP2 configures the first type of region thereof according to the receiving-sending relationship with a transmission point which is closer to the data flow endpoint and communicates with the relayTP2. Therefore, the positions of the first type of regions in different time units may be different. As shown in FIG. 6(b), when setting the first type of region by referring to the transmission point closer to the starting point of the downlink transmission, when the relayTP2 uses the link1, the first type of region is set to send firstly and then receive by referring to the relayTP1; while when a link2 is used, the first type of region is set to receive firstly and then send by referring to the donorTP2.

Figure 7:
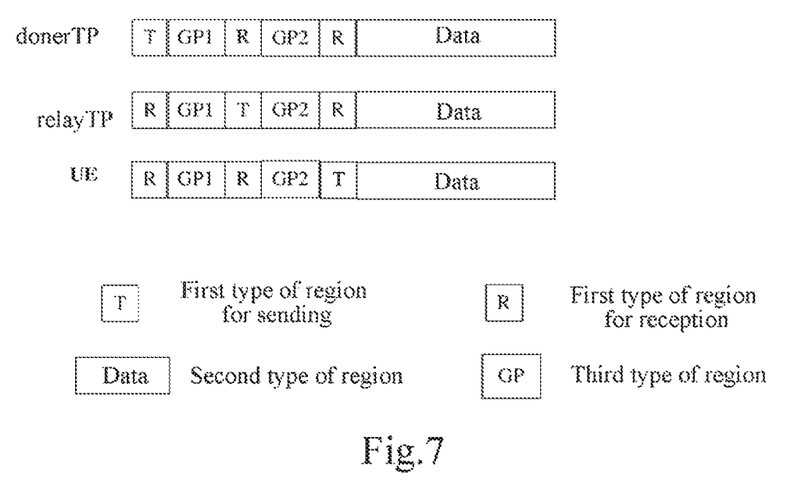
FIG. 7 is a schematic diagram of configuring the first type of region according to a fifth embodiment of the present disclosure.

In a fifth embodiment, the receiving and sending functions of each control region can be set flexibly through the embodiments of the present disclosure; meanwhile, the quantity and positions of the first type of regions can also be configured flexibly. In the network shown in FIG. 5(a), FIG. 7 is a schematic diagram of configuring a first type of region. As shown in FIG. 7, it is assumed that mutual measurement between every two of a donorTP, a UE and a relayTP needs to be completed in one time unit so as to perform resource allocation, link selection and UE serving cell selection. At this time, three first type of regions may be set in one time unit through a configuration signaling; moreover, all the three first type of regions are disposed at the left side of second type of region; in addition, sending areas of three transmission points are set to be staggered from each other, thus achieving the mutual measurement among the donorTP, the relayTP and the UE. In the method of the related art, the time unit has only two control regions, one control region is disposed at the head of the time unit for downlink and the other is disposed at the tail of the time unit for uplink; therefore, mutual measurement among multiple transmission points cannot be supported. It should be noted that a GP is also used between two regions having the same receiving and sending functions in the figure, which is for achieving the time alignment of receiving and sending.

Figure 8A:
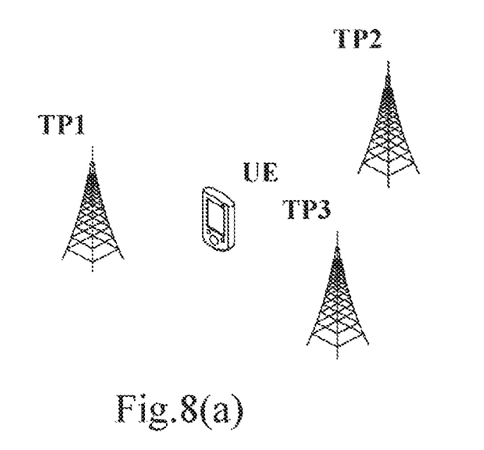
FIG. 8(a) is a schematic diagram of an ultra dense network according to a sixth embodiment of the present disclosure.
Figure 8B:
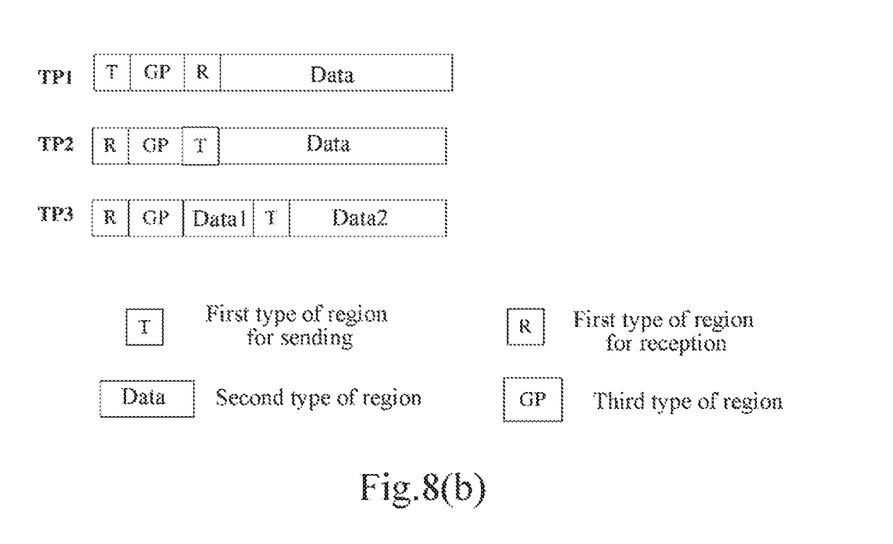
FIG. 8(b) is a schematic diagram of configuring the first type of region according to the sixth embodiment of the present disclosure.

In a sixth embodiment, multiple-hop transmission can be better supported by the embodiments of the present disclosure; moreover, interference coordination in an ultra dense network can also be better supported. FIG. 8(a) is a schematic diagram of an ultra dense network. As shown in FIG. 8(a), in the ultra dense network, a strong interference exists among TPs easily due to a high density of the TPs, a large number of adjacent TPs and a small distance among the TPs. Because control channels and the reference signals are the basis for a series of important functions such as data receiving and cell selection, the mutual interference between the control channels and the reference signals needs to be solved emphatically. FIG. 8(b) is a schematic diagram of configuring a region of a first type. As shown in FIG. 8(b), the time positions for sending of the first type of regions can be flexibly set through the embodiments of the present disclosure, so as to provide more freedom for the interference coordination in the ultra dense network. The time positions of the first type of regions are staggered by using the embodiments of the present disclosure, so that interference can be avoided. However, the time positions of control domains according to the method of the related art are same, so the interference therebetween may occur easily.

Figure 9:
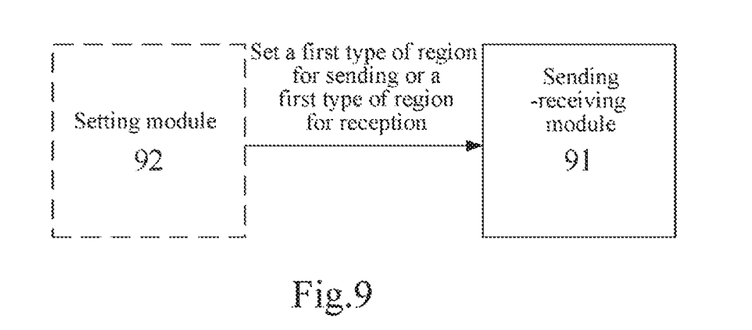
FIG. 9 is a schematic diagram of a structural composition of a device for transmitting a signal according to an embodiment of the present disclosure.

Referring to FIG. 9, the embodiment of the present disclosure also provides a device for transmitting a signal, including:

a sending-receiving module 91 configured to send and/or receive a signal and/or data in a time unit;

wherein, the time unit includes: at least one first type of region used to send or receive a signal, and at least one second type of region used to send or receive data, and at least one third type of region in which no signals or data are sent or received.

The device according to the embodiment of the present disclosure further includes:

a setting module 92 configured to set the first type of region as a first type of region for sending or a first type of region for reception.

In the device according to the embodiment of the present disclosure, the setting module 92 is configured to:

set the first type of region as the first type of region for sending or the first type of region for reception according to a signal sending or receiving demand;

or, set the first type of region as the first type of region for sending or the first type of region for reception according to a configuration signaling from another transmission point.

In the device according to the embodiment of the present disclosure, the setting module 92 is configured to:

when sending the signal to another transmission point in the time unit, set the first type of region corresponding to the first type of region for reception of said another transmission point as the first type of region for sending;

or, when receiving the signal from another transmission point in the time unit, set the first type of region corresponding to the first type of region for sending of said another transmission point as the first type of region for reception;

or, set the first type of region as the first type of region for sending or the first type of region for reception according to a configuration signaling from another transmission point.

In the device according to the embodiment of the present disclosure, the setting module 92 is configured to:

set the first type of region as the first type of region for sending or the first type of region for reception according to a signal sending or receiving demand;

or, receive a configuration signaling from another transmission point; set the first type of region for sending indicated in the configuration signaling as the first type of region for sending, and set the first type of region for reception indicated in the configuration signaling as the first type of region for reception.

In the device according to the embodiment of the present disclosure, the setting module 92 is configured to:

set the first type of region as the first type of region for sending or the first type of region for reception according to a signal sending or receiving demand;

or, receive the configuration signaling from another transmission point in a semi-static state or dynamically; set the first type of region for sending indicated in the configuration signaling as the first type of region for sending, and set the first type of region for reception indicated in the configuration signaling as the first type of region for reception.

Those skilled in the art may understand that all or part of the steps of the foregoing embodiments may be implemented by using a computer program flow which may be stored in a computer-readable storage medium and is executed on a corresponding hardware platform (such as a system, equipment, a device, an apparatus, etc.), and during execution, one or a combination of the steps of the method embodiments is included.

Optionally, all or part of the steps in the above embodiments may also be implemented by using integrated circuits. These steps may be implemented by separately manufacturing the steps as integrated circuit modules, or multiple modules or steps may be manufactured into a single integrated circuit module.

The devices/functional modules/functional units in the above embodiments which can be implemented by using general-purpose calculating devices, may either be centralized on a single computing device or distributed on a network formed by multiple computing devices.

The devices/functional modules/functional units in the above embodiments may also be stored in a computer-readable storage medium if being implemented in the form of a software functional module and sold or used as an independent product. The above-mentioned computer-readable storage medium may be a read-only memory, a magnetic disk, an optical disk, or the like.

INDUSTRIAL APPLICABILITY

Through the embodiments of the present disclosure, the positions and quantities of the regions of each type in the transmission point can be configured as needed, which improves the configuration flexibility of the transmission demand of multiple-hop transmission points.

What is claimed is:

1. A method for transmitting a signal, comprising:
sending and/or receiving, by a transmission point, a signal and/or data in a time unit;
wherein, the time unit is a timeslot and comprises more than one first type of region each configured to semi-statically or dynamically switch between sending and receiving a signal, at least one second type of region used to send or receive data, and at least one third type of region in which no signal or data is sent or received.

2. The method according to claim 1, wherein resource mapping methods and/or configuration parameters for signals of individual first type of regions in the same time unit are independent from each other.

3. The method according to claim 1, wherein the method, before sending and/or receiving, by the transmission point, the signal and/or data in the time unit, further comprises:
setting, by the transmission point, the first type of region as a first type of region for sending or a first type of region for reception.

4. The method according to claim 3, wherein the setting, by the transmission point, the first type of region as the first type of region for sending or the first type of region for reception comprises:
setting, by the transmission point, the first type of region as the first type of region for sending or the first type of region for reception according to a signal sending or receiving demand; or
setting, by the transmission point, the first type of region as the first type of region for sending or the first type of region for reception according to a configuration signaling from another transmission point.

5. The method according to claim 4, wherein the setting, by the transmission point, the first type of region as the first type of region for sending or the first type of region for reception according to the signal sending or receiving demand comprises:
when sending the signal to another transmission point in the time unit, setting, by the transmission point, the first type of region corresponding to the first type of region for reception of said another transmission point as the first type of region for sending; or
when receiving the signal from another transmission point in the time unit, setting, by the transmission point, the first type of region corresponding to the first type of region for sending of said another transmission point as the first type of region for reception.

6. The method according to claim 4, wherein the setting, by the transmission point, the first type of region as the first type of region for sending or the first type of region for reception according to the configuration signaling from another transmission point comprises:
receiving, by the transmission point, the configuration signaling from said another transmission point; and
setting the first type of region for sending indicated in the configuration signaling as the first type of region for sending and/or setting the first type of region for reception indicated in the configuration signaling as the first type of region for reception, by the transmission point.

7. The method according to claim 6, wherein the receiving, by the transmission point, the configuration signaling from said another transmission point comprises:
receiving, by the transmission point, the configuration signaling from said another transmission point semi-statically or dynamically.

8. The method according to claim 1, wherein receiving and sending functions of the first type of regions in different time units are independent from each other.

9. The method according to claim 8, wherein the receiving and sending functions of the first type of regions in different time unit are independent from each other, comprising:
the receiving and sending functions of the first type of regions having the same positions in part of the time units are the same; or
the receiving and sending functions of the first type of regions having the same positions in part of the time units are different; or
the receiving and sending functions of part of the first type of regions having the same positions in part of the time units are different; or
the receiving and sending functions of part of the first type of regions having the same positions in part of the time units are the same.

10. The method according to claim 1, wherein part of the first type of regions is the first type of region for sending and the others are the first type of region for reception, or all the first type of regions are the first type of regions for sending or receiving.

11. The method according to claim 1, wherein the signal is a control signal and/or a reference signal.

12. The method according to claim 11, wherein the control signal is a feedback signaling corresponding to data transmission, and/or a scheduling signaling corresponding to data transmission, and/or a measurement feedback signaling, and information carried by the control signal comprises at least one of the followings: downlink data scheduling information, uplink data scheduling information, downlink data feedback information, uplink data feedback information, and channel measurement feedback information.

13. The method according to claim 1, wherein all the first type of regions are disposed at the same side of all the second type of regions, or the first type of regions are disposed at both sides of all the second type of regions, or the first type of regions and the second type of regions are distributed in an interleaved manner.

14. The method according to claim 1, wherein the third type of region is disposed between two of the first type of regions, and/or the third type of region is disposed between the first type of region and the second type of region.

15. The method according to claim 1, wherein the third type of region is used for signal sending-receiving conversion, or interference protection, or time alignment.

16. The method according to claim 1, wherein the time unit is a minimum time unit for one scheduling or resource allocation in a time domain.

17. The method according to claim 1, wherein at least one of the time units are a time unit for one scheduling or resource allocation.

18. A device for transmitting a signal, comprising:
a processor; and
a memory for storing instructions executable by the processor;
wherein the processor is configured to send and/or receive a signal and/or data in a time unit; and
wherein, the time unit is a timeslot and comprises more than one first type of region each configured to semi-statically or dynamically switch between sending and receiving a signal, at least one second type of region used to send or receive data, and at least one third type of region in which no signal or data is sent or received.

19. The device according to claim 18, wherein the processor is further configured to a setting module configured to set the first type of region as a first type of region for sending or a first type of region for reception.

20. A non-transitory computer-readable storage medium storing a computer-executable instruction, wherein the computer-executable instruction is configured to transmit and/or receive, by a node, a signal and/or data in a time unit,
wherein, the time unit is a timeslot and comprises more than one first type of region each configured to semi-statically or dynamically switch between sending and receiving a signal, at least one second type of region used to transmit or receive data, and at least one third type of region in which no signal or data is transmitted or received.

* * * * *